United States Patent Office 2,871,115
Patented Jan. 27, 1959

2,871,115

METHOD OF PREPARING SELF-FLUXING SYNTHETIC IRON SCRAP

Jagdish C. Agarwal, Penn Township, Allegheny County, Pa., assignor to United States Steel Corporation, a corporation of New Jersey No Drawing. Application June 1, 1956
Serial No. 588,632

2 Claims. (Cl. 75—3)

This invention relates to a self-fluxing synthetic scrap iron product and to a method of preparing the same.

In the usual fluidized bed direct reduction process as applied to iron ore, ore fines are treated at an elevated temperature with a reducing gas, such as hydrogen which may contain carbon monoxide in an amount up to about 25 percent by volume. The iron oxide present in the ore is reduced at least partially to metallic iron, but the accompanying gangue remains substantially unchanged. Commonly the reduced fines are agglomerated without re-oxidation, for example in a briquetting press, and the agglomerates charged to a steelmaking furnace, such as an open hearth. These agglomerates replace the usual scrap in the charge to the furnace, or when only partially reduced, can also replace ore. The presence of unreduced gangue necessitates the addition of an appropriate quantity of lime flux.

One difficulty encountered during the reduction process is the tendency of reduced particles to stick together and stop fluidization. This tendency is greater with ores of lower gangue content, and often limits the temperature at which the process can be carried out. A minimum reaction temperature of about 1300° F. is desirable to furnish rapid rates, yet some ores have a sticking temperature as low as about 1100° F.

One difficulty encountered in handling the reduced iron product is its tendency to reoxidize. Hot freshly reduced iron particles are pyrophoric, and must be kept away from air or other oxidizing gas until agglomerated. Even after particles are agglomerated and cooled, outer surfaces of the agglomerates tend to reoxidize.

An object of the present invention is to provide an improved agglomerated synthetic scrap iron product which not only is self-fluxing, but overcomes one or both of the difficulties of particles sticking and exposed surfaces reoxidizing.

A further object is to provide an improved method of preparing synthetic scrap iron by directly reducing ore in fluidized beds and agglomerating the reduced product, which method renders the scrap self-fluxing, as well as overcoming one or both the foregoing difficulties.

A more specific object is to provide an improved agglomerated synthetic scrap iron product and method of preparing the same wherein sufficient lime is incorporated with the agglomerates to render them self-fluxing, the lime being present in the reduction vessel to prevent sticking and/or coated on the outside of the agglomerates to prevent their surfaces from reoxidizing.

In accordance with my invention, lime is incorporated with the reduced and agglomerated synthetic scrap product in an amount calculated to flux the silica and phosphorus present therein as gangue. If an excess of lime beyond the calculated amount is needed to prevent sticking or reoxidation, the excess can be included in the agglomerates and later used for fluxing other materials in the steelmaking charge. The composition of the agglomerates is as follows:

Lime—about 1 to 30 percent
Gangue—up to about 10 percent
Iron-bearing fines—balance The lime can be in the form either of calcium carbonate, calcium oxide, or other alkaline earth equivalents, such as dolomite; hence the term "lime" is intended to refer to these materials generically. In the preferred way of practicing the invention, part of the lime is mixed with ore fines prior to reduction, and the balance coated on the surface of the agglomerates. Lime mixed with the ore fines in the reduction process retards sticking and remains intimately mixed with iron-bearing fines and gangue in the agglomerates, while that coated on the agglomerates retards surface reoxidation.

The actual reduction process can follow any desired procedure, that is, either continuously or in batches, either in one step or two, and either totally or partially. The ore can contain up to about 8 percent gangue, and it is preheated to about 1600 to 1900° F. before it enters the reduction vessel. Limestone conveniently is introduced to the preheater along with the ore. At the preheating temperature limestone calcines, but the resulting $CO_2$ is excluded from the actual reduction system and the heat of calcination is supplied outside the reduction system. The reducing reactions are endothermic, and the lime serves as an additional heat carrier. The range of lime added is about 1 to 20 percent by weight of ore charged. The temperature in the reduction vessel commonly is within the range of about 1200 to 1600° F. and the presence of lime allows the reduction to be carried out at such temperatures without sticking. Alternatively lime can be added directly to the reduction vessel.

Following the reduction process, the iron-bearing fines, accompanying gangue, and lime are agglomerated and cooled in any conventional way, care being taken to prevent contact with air. Preferably additional lime in finely divided form is then applied to the surface of the agglomerates. Conveniently limestone and agglomerates are tumbled together in any conventional tumbler. The lime can be slightly moistened with water or fuel oil to improve its adherence. The resulting coating prevents further direct contact of the agglomerates with air and thus prevents their surfaces from reoxidizing.

As a specific example of my invention, synthetic scrap was produced by reducing a typical Venezuelan ore of the following composition:

| | Percent |
|---|---|
| Fe (as $Fe_2O_3$) | 58.0 |
| Free water | 8.0 |
| Loss on ignition | 6.5 |
| Gangue material: | |
|    Silica | 1.0 |
|    Phosphorus | 0.05 |
|    Others | 1.65 |
| | 2.70 |

A 95 percent reduced product from this ore contains 4.36 percent gangue of which 1.62 percent is silica and 0.081 percent phosphorus. The weight of limestone required to make this product self-fluxing in an open hearth was calculated on the assumption that the requirements are 2 mols of CaO per mol of silica and 1.5 mols of CaO per mol of phosphorus. On this basis the foregoing ore requires 73.06 pounds of limestone per ton or 3.65 percent limestone to render it self-fluxing. This amount of limestone plus a reasonable excess can be apportioned as desired between the ore fed to the reduction vessel and as a coating on the agglomerates. The composition of the final agglomerates was as follows:

| | Percent |
|---|---|
| Iron bearing fines | 92.58 |
| Gangue | 4.22 |
| Lime as CaO | 3.20 |
| | 100.00 | or

| | |
|---|---|
| Iron bearing fines | 90.32 |
| Gangue | 4.12 |
| Lime as $CaCO_3$ | 5.56 |
| | 100.00 |

Where sticking is not a problem, all or most of the lime preferably is coated on the agglomerates to avoid the necessity of heating it to the reduction temperature. As sticking becomes a greater problem, more lime is added to the reduction vessel.

While I have described only certain preferred ways of practicing my invention, it is apparent that other modifications may arise. Therefore I do not wish to be limited by the disclosure but only by the scope of the appended claims.

I claim:

1. A method of preparing self-fluxing synthetic scrap iron comprising mixing lime with iron ore fines in an amount equivalent to about 1 to 20 percent lime by weight of the ore, directly at least partially reducing said ore by treatment with a reducing gas in a fluidized bed at a temperature within the range of about 1200 to 1600° F. but leaving the gangue unreduced, agglomerating the reduced fines, gangue and lime without reoxidation, and coating the surfaces of the agglomerates with additional lime to prevent reoxidation.

2. A method of preparing self-fluxing synthetic scrap iron comprising mixing lime with iron ore fines containing up to about 8 percent gangue, the amount of lime being equivalent to about 1 to 20 percent by weight of ore, directly at least partially reducing said ore by treatment with a reducing gas in a fluidized bed at a temperature within the range of about 1200 to 1600° F. but leaving the gangue unreduced, the lime preventing reduced particles from sticking, agglomerating the reduced fines, gangue and lime without reoxidation, and coating the surfaces of the agglomerates with additional lime to prevent their reoxidation, the final composition of the agglomerates being about 1 to 30 percent by weight of lime, up to about 10 percent by weight gangue and the balance iron-bearing fines.

References Cited in the file of this patent

UNITED STATES PATENTS

| | | |
|---|---|---|
| 1,303,799 | Jarvis | May 13, 1919 |
| 1,551,554 | Greiner | Sept. 1, 1925 |
| 2,368,508 | Wile | Jan. 30, 1945 |
| 2,758,021 | Drapeau | Aug. 7, 1956 |

FOREIGN PATENTS

| | | |
|---|---|---|
| 47,622 | Sweden | Aug. 25, 1920 |